US007259658B2

(12) United States Patent
Noguchi et al.

(10) Patent No.: US 7,259,658 B2
(45) Date of Patent: Aug. 21, 2007

(54) PASSIVE INFRARED SENSOR AND OBSTACLE DETECTION SYSTEM USED IN THE SAME

(75) Inventors: Michinori Noguchi, Otsu (JP); Cholmin Seo, Otsu (JP)

(73) Assignee: OPTEX Co., Ltd., Shiga (JP)

( * ) Notice: Subject to any disclaimer, the term of this patent is extended or adjusted under 35 U.S.C. 154(b) by 155 days.

(21) Appl. No.: 11/064,512

(22) Filed: Feb. 24, 2005

(65) Prior Publication Data

US 2005/0200473 A1 Sep. 15, 2005

(30) Foreign Application Priority Data

Feb. 27, 2004 (JP) ............................ 2004-054380

(51) Int. Cl.
*B60R 25/10* (2006.01)
*G08B 13/08* (2006.01)

(52) U.S. Cl. ............... 340/426.26; 340/541; 340/545.3

(58) Field of Classification Search ........... 340/426.26, 340/567, 541, 545.3, 552, 555, 561, 507, 340/514, 565; 250/338.1, 339.02
See application file for complete search history.

(56) References Cited

U.S. PATENT DOCUMENTS 4,752,768 A 6/1988 Steers et al. ................ 340/567
4,772,797 A * 9/1988 Kahl et al. .................. 250/353
4,778,996 A * 10/1988 Baldwin et al. ............ 250/353
4,982,094 A * 1/1991 Matsuda ...................... 250/342
5,091,648 A * 2/1992 Owers et al. ............... 250/342
5,243,326 A * 9/1993 Disabato ..................... 340/555
5,489,892 A 2/1996 Imuro et al. ................ 340/567
6,031,456 A * 2/2000 Hanyuda ..................... 340/555
6,411,215 B1 * 6/2002 Shnier ..................... 340/686.1

FOREIGN PATENT DOCUMENTS

JP 2-287278 11/1990
JP 7-174622 7/1995
WO 96/06865 3/1996

* cited by examiner

*Primary Examiner*—Toan N. Pham
(74) *Attorney, Agent, or Firm*—Wenderoth, Lind & Ponack, L.L.P.

(57) ABSTRACT

According to one embodiment of a passive infrared sensor, a passive infrared sensor 1 where an infrared sensing element 5 and an optical system 4 that sets a detection area A1 of the infrared sensing element 5 are covered with a cover 2. The passive infrared sensor 1 includes: a light emitting element 6 that emits infrared light from the inside of the cover 2 to the outside through the optical system 4; a reflective region 2*b* that is disposed outside the cover 2 and reflects at least some of the infrared light emitted from the light emitting element 6; and a light receiving element 7 that receives the infrared light reflected by the reflective region 2*b*, transmitted through the optical system 4 and reaching the inside of the cover 2.

18 Claims, 3 Drawing Sheets

PASSIVE INFRARED SENSOR AND OBSTACLE DETECTION SYSTEM USED IN THE SAME

CROSS-REFERENCE TO RELATED APPLICATION

This application claims the benefit of priority under 35 U.S.C.§119(a) from Patent Application No. 2004-54380 filed Feb. 27, 2004, in Japan, the full contents of which are incorporated herein by reference.

BACKGROUND OF THE INVENTION

1. Field of Invention

The present invention relates to a passive infrared sensor that detects the presence of an intruder in a security area by receiving the infrared light that the intruder emits, and in particular to a passive infrared sensor that can detect sabotage of the operation of the passive infrared sensor and to an obstacle detection system used therein.

2. Conventional Art

A passive infrared sensor is configured to receive infrared light from an intruder in a detection area set in a security area and to detect the presence of the intruder from the difference in temperature between the intruder's body and the surrounding area. An infrared light receiving window for introducing the light of the detection area is disposed in the passive infrared sensor, but when there is sabotage, such as when the outer side of the light receiving window has been deliberately covered with some kind of light blocking object, the passive infrared sensor loses its detection function. When the passive infrared sensor loses its detection function, alarm signals are not outputted even if there is an illegal intruder. Actual sabotage may include a case where, during the time that the passive infrared sensor is inoperative when the coming and going of people into and out of the room disposed with the passive infrared sensor is high, someone deliberately sprays transparent paint that does not transmit far-infrared light, or adheres adhesive tape, on the front surface of the cover of the security sensor, so that the passive infrared sensor becomes unable to detect the presence of a human body, and an intruder intrudes into the room during the time that the passive infrared sensor is operative when people are no longer entering and leaving the room.

A security sensor disposed with a radiant energy detection apparatus that detects the presence of a light blocking object interfering with the detection function has been proposed (e.g., see Japanese Patent Application Laid-Open Publication (JP-A) No. 2-287278). This radiant energy detection apparatus is disposed with a light emitting element, which emits near-infrared light or visible light towards the inner surface of a portion of a cover of the security sensor through which far-infrared light from a human body passes, and a light receiving element, which receives the reflected light of the near-infrared light from the inner surface of the cover. The radiant energy detection apparatus is configured to detect the presence of an obstructive object on the outer surface of the cover by detecting an increase in the amount of incident light at the light receiving element resulting from the light reflected from the obstructive object applied to the outer surface of the cover being added to the light reflected from the inner surface of the cover.

FIGS. 3(*a*) and 3(*b*) are schematic views describing the operating principle of a passive infrared sensor 20 applying this prior art. FIG. 3(*a*) shows an ordinary state where an obstructive object 8 is not present, and FIG. 3(*b*) shows a state where the obstructive object 8 is approaching.

As shown in FIGS. 3(*a*) and 3(*b*), a lens 4 is disposed in a light receiving window formed in the center of the front surface (the left side in the drawings) of a box-like case 22 of the passive infrared sensor 20. Infrared light from a detection area A0 is guided by the lens 4 to a passive infrared light receiving sensor 5 disposed inside the case 22 in the center of the back (the right side in the drawings) of the case 22. Moreover, an infrared light emitting diode 6 is disposed in the vicinity of the lens 4 at an upper portion inside the case 22 and configured to emit obstructive object detection-use infrared light through the lens 4 and diagonally downward to the outside of the case 22. An infrared light receiving diode 7 is horizontally disposed in the vicinity of the lens 4 at a lower portion inside the case 22 and configured to receive the infrared light coming from the outside of the case 22 and transmitted through the lens 4.

As shown in FIG. 3(*a*), in an ordinary state where the obstructive object 8 is not present, the infrared light L1 emitted in the front direction of the infrared light emitting diode 6 proceeds without being obstructed. Thus, the infrared light L1*f* reflected by some kind of object ordinarily does not return to the infrared light receiving diode 7. However, the infrared light L2 which is the part of the emitted infrared light inside the case 22 within the projection angle of the infrared light emitting diode 6 is reflected by the inner surface of the lens 4, and the reflected infrared light L2*a* reaches the infrared light receiving diode 7. The amount of light received by the infrared light receiving diode 7 in this case is an intermediate value (reference received-light amount) corresponding to the ordinary state where the obstructive object 8 is not present.

As shown in FIG. 3(*b*), when the obstructive object 8 approaches the passive infrared sensor 20, the infrared light L1 emitted in the front direction of the infrared light emitting diode 6 is reflected by the surface of the obstructive object 8, and the reflected infrared light L1*f* here reaches the infrared light receiving diode 7. For this reason, the amount of infrared light received by the infrared light receiving diode 7 becomes the sum of the infrared light L2*a* and the infrared light L1*f*, and becomes larger than the intermediate value corresponding to the ordinary state where the obstructive object 8 is not present. In this manner, the passive infrared sensor 20 can detect the approach and/or presence of the obstructive object 8 using the change in the amount of infrared light received by the infrared light receiving diode 7. However, because there is little infrared light L1*f* in a case where the obstructive object 8 is a light absorber such as black cloth, the amount of infrared light received by the infrared light receiving diode 7 does not change that much. For this reason, there are cases where reliable detection is not possible depending on the type of obstructive object 8.

As other prior art, an infrared human body detection apparatus has also been proposed which, when a light blocking object resulting from sabotage has been placed over the light receiving window and when a light blocking object has been placed away from the light receiving window, immediately detects the light blocking object even if it is a light absorber such as black cloth or a black plate and outputs a detection signal (e.g., see JP-A No. 7-174622). This infrared human body detection apparatus includes a sensor that receives, through the light receiving window, the infrared light that a human body emits and detects the presence of a human body with an electrical signal of the sensor. The infrared human body detection apparatus also includes a light emitting element that emits infrared light from the outer side of the light receiving window, a light receiving element disposed at the inner side of the light receiving window, and an obstructive object detection optical path that guides some of the light emitted by the light emitting element to the light receiving element. According to this infrared human body detection apparatus, when a blocking object is adhered to and covers the light receiving window, the amount of light made incident at the light receiver is reduced, and the fact that the detection apparatus has been sabotaged is detected from the change in the amount of received light. Also, when a blocking object has been placed away from the light receiving window, the light reflected by the blocking object is made incident at the light receiver in addition to the light made incident at the light receiver from the light emitter when there is no obstructive object. Thus, the amount of incident light at the light receiver increases, and the fact that the detection apparatus has been sabotaged is detected from the change in the amount of incident light.

However, in the above prior art, it has been mainly assumed that the passive infrared sensor is disposed indoors. When the passive infrared sensor is disposed outdoors, the light receiving element that receives the obstructive object detection-use infrared light is affected by strong ambient light such as sunlight, and there is the possibility for the passive infrared sensor to become unable to exhibit a sufficient obstructive object detecting capability or for the passive infrared sensor to malfunction. When such a device is disposed outdoors, sometimes frost or the like adheres to the lens due to a radiation cooling phenomenon or the like during cold periods, and sometimes the obstructive object detecting capability drops due to some of the infrared light from the detection area not reaching the passive infrared light receiving sensor.

SUMMARY OF THE INVENTION

In view of the problems in the prior art, it is an object of the present invention to provide a passive infrared sensor that exhibits, with a simple configuration, a high obstructive object detecting capability without being affected that much by ambient light even if it is disposed outdoors, and which is also disposed with means doubling as a counter to frost during cold periods or the like, and to provide an obstacle detection system used in the passive infrared sensor.

In order to achieve this object, one aspect of the invention provides a passive infrared sensor where an infrared sensing element and an optical system that sets a detection area of the infrared sensing element are covered with a cover, the passive infrared sensor including: at least one light emitting element that emits infrared light from the inside of the cover to the outside through the optical system; at least one reflective region that is disposed outside the cover and reflects at least some of the infrared light emitted from the light emitting element; and at least one light receiving element that receives the infrared light reflected by the reflective region, transmitted through the optical system and reaching the inside of the cover.

Here, the reflective region may be part of an undersurface of a projecting portion disposed outside the cover, but in this case it is preferable for the undersurface of the projecting portion to be a glossy surface. Alternatively, the reflective region may be formed by disposing a reflective member on the undersurface of the projecting portion. It is preferable for the light emitting element and the light receiving element to be disposed in mutual proximity below the projecting portion and for the directions in which the light is emitted and received to face the projecting portion. When a hood for countering frost is disposed outside the cover, the undersurface of the hood may be used to dispose the reflective region.

According to the passive infrared sensor of this aspect of the invention, the infrared light emitted to the outside from the light emitting element disposed inside the passive infrared sensor is reflected outside, and the reflected light is received by the light receiving element disposed inside the passive infrared sensor. Thus, when an obstructive object approaches the passive infrared sensor, the amount of light received by the light receiving element changes in accordance with the reflectance or the like of the obstructive object. Therefore, the approach and/or presence of the obstructive object can be detected by the change in the amount of light received by the light receiving element. When the undersurface of the frost-countering hood disposed outside the cover is used as the reflective region, affects resulting from ambient light such as sunlight can be suppressed, and the passive infrared sensor can exhibit a high obstructive object detecting capability even outdoors.

In order to achieve the above object, another aspect of the invention provides an obstacle detection system used in a passive infrared sensor where an infrared sensing element and an optical system that sets a detection area of the infrared sensing element are covered with a cover, the obstacle detection system including: at least one light emitting element that emits infrared light from the inside of the cover to the outside through the optical system; at least one reflective member that is disposed outside the cover and reflects at least some of the infrared light emitted from the light emitting element; and at least one light receiving element that receives the infrared light reflected by the reflective member, transmitted through the optical system and reaching the inside of the cover.

Here, it is preferable for the light emitting element and the light receiving element to be disposed in mutual proximity so that the direction in which the infrared light is emitted by the light emitting element and the direction in which the infrared light is received by the light receiving element both face diagonally upward. It is also necessary for the reflective member to be disposed above the passive infrared sensor and on an extension line of the direction in which the infrared light is emitted by the light emitting element and the direction in which the infrared light is received by the light receiving element.

According to the obstacle detection system of this aspect of the invention, the infrared light emitted to the outside from the light emitting element disposed inside the passive infrared sensor is reflected outside, and the reflected light is received by the light receiving element disposed inside the passive infrared sensor. Thus, when an obstructive object approaches the passive infrared sensor, the amount of light received by the light receiving element changes in accordance with the reflectance or the like of the obstructive object. Therefore, the approach and/or presence of the obstructive object can be detected by the change in the amount of light received by the light receiving element. Because it is not necessary for a hood portion to be formed on the passive infrared sensor body, a reflective plate may be disposed at another place such as on an optional cover. Thus, restrictions such as the shape of the passive infrared sensor body can be reduced.

BRIEF DESCRIPTION OF THE DRAWINGS

FIG. 1(*b*) is a schematic view describing the operating principle of the passive infrared sensor associated with the first embodiment of the invention, and shows a state where an obstructive object is present in the vicinity of the outer side of a hood portion of a case.

FIG. 1(*c*) is a schematic view describing the operating principle of the passive infrared sensor associated with the first embodiment of the invention, and shows a state where an obstructive object is present in the vicinity of a lens.

FIG. 2(*b*) is a schematic view describing the operating principle of the obstacle detection system associated with the second embodiment of the invention, and shows a state where an obstructive object is present in the vicinity of a lens of the passive infrared sensor.

FIG. 3(*b*) is a schematic view describing the operating principle of the passive infrared sensor applying prior art, and shows a state where an obstructive object is approaching.

DESCRIPTION OF THE PREFERRED EMBODIMENTS

Embodiments of the invention will be described below with reference to the drawings.

First Embodiment

Figure 1A:
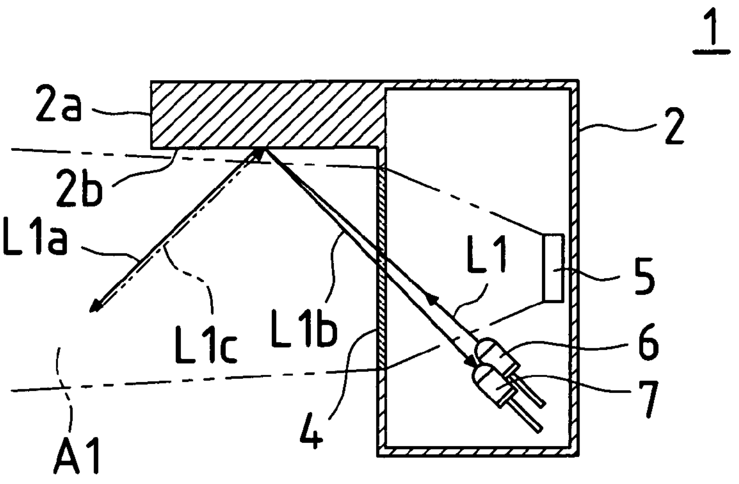
FIG. 1(*a*) is a schematic view describing the operating principle of a passive infrared sensor associated with a first embodiment of the invention, and shows an ordinary state where an obstructive object is not present.
Figure 1B:
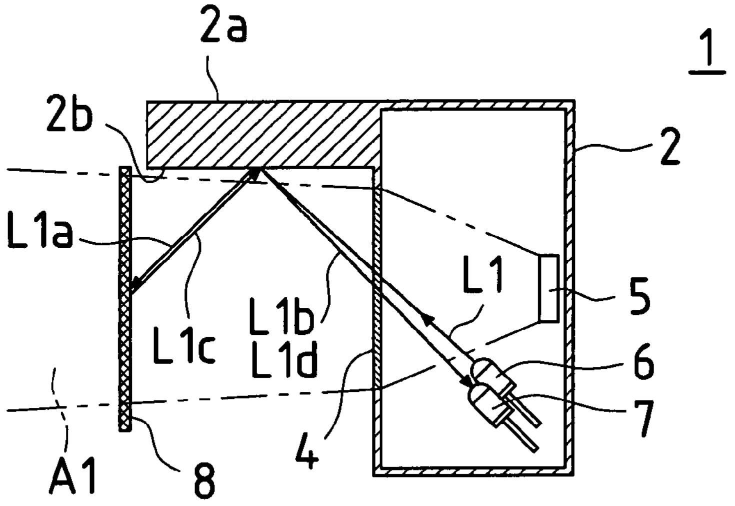
Figure 1C:
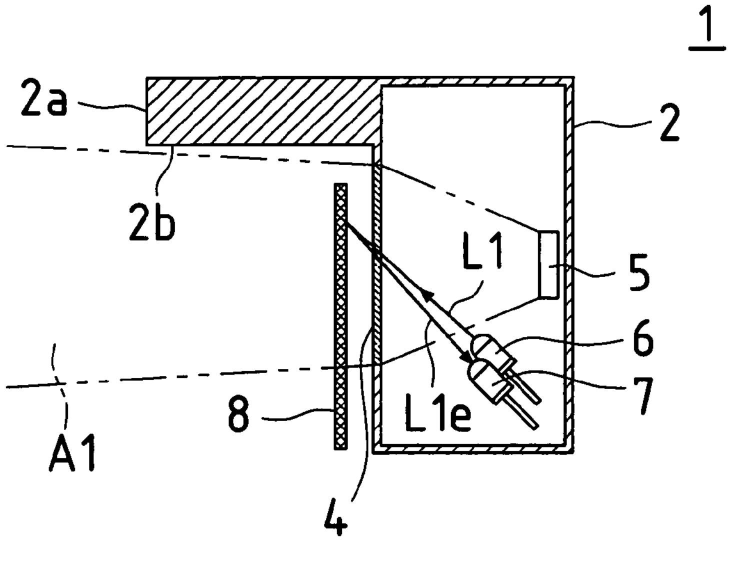
Figure 3A:
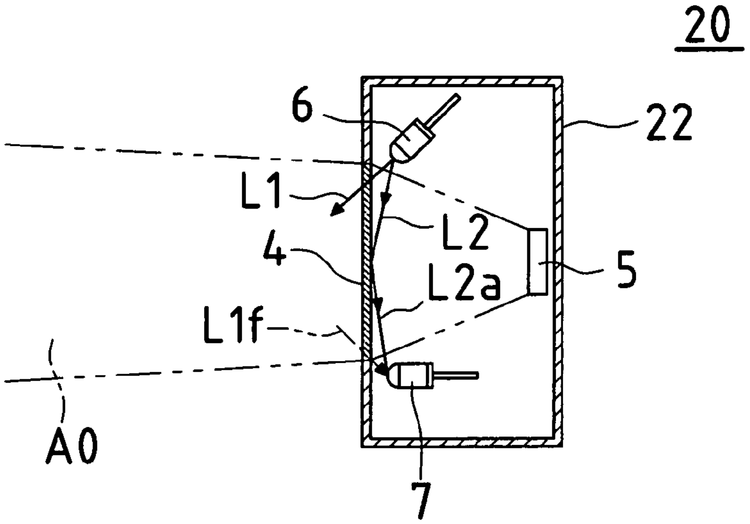
FIG.3(a) Conventional Art
FIG. 3(*a*) is a schematic view describing the operating principle of a passive infrared sensor applying prior art, and shows an ordinary state where an obstructive object is not present.
Figure 3B:
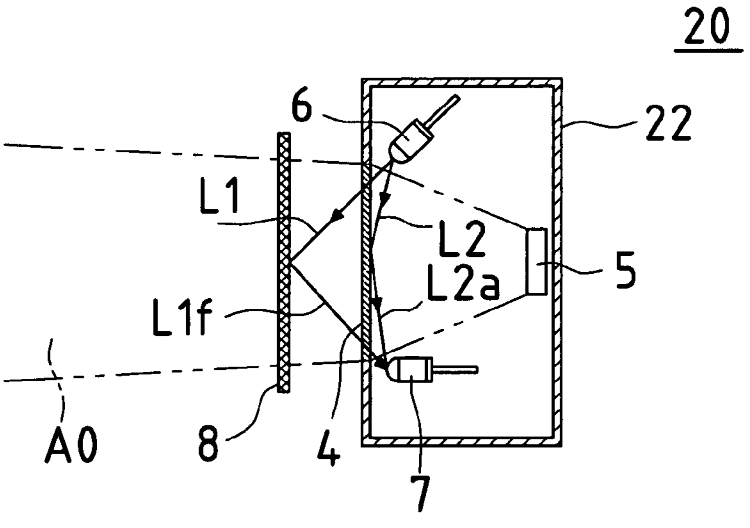
FIG.3(b) Conventional Art

FIGS. 1(*a*) to 1(*c*) are schematic views describing the operating principle of a passive infrared sensor 1 associated with a first embodiment of the invention. FIG. 1(*a*) shows an ordinary state where an obstructive object 8 is not present, FIG. 1(*b*) shows a state where the obstructive object 8 is present in the vicinity of the outer side of a hood portion 2*a* of a case 2, and FIG. 1(*c*) shows a state where the obstructive object 8 is present in the vicinity of a lens 4. The same reference numerals will be used with respect to constituent members that are the same as those in the prior art described with reference to FIGS. 3(*a*) and 3(*b*).

As shown in FIGS. 1(*a*) to 1(*c*), in the passive infrared sensor 1, a lens 4 (optical system) is disposed in a light receiving window formed in the center of the front surface (the left side in the drawings) of a box-like case 2 (cover). Infrared light from a detection area Al is guided by the lens 4 to a passive infrared light receiving sensor 5 (infrared sensing element) disposed inside the case 2 in the center of the back (the right side in the drawings) of the case 2.

A visor-like hood portion 2*a* is formed above the lens 4 at the outer side of the case 2. The hood portion 2*a* is configured to ensure that strong light from above does not directly strike the lens 4 and to prevent frost or the like from adhering to the lens 4 during cold periods or the like. The hood portion 2*a* includes a hood portion undersurface 2*b* which is formed as a glossy surface. Alternatively, rather than forming the hood portion undersurface 2*b* itself as a glossy surface, a separate member such as a reflective plate may be disposed on the hood portion undersurface 2*b*. It is preferable for the hood portion 2*a* to be of a length where sunlight or the like does not directly strike the lens 4 and so that vignetting of the detection area A1 does not occur.

An infrared light emitting diode 6 (light emitting element) is disposed facing diagonally upward at a lower portion inside the case 2. The infrared light emitting diode 6 is configured to transmit obstructive object detection-use infrared light through the vicinity of the center of the lens 4 to the vicinity of the center of the hood portion undersurface 2*b*. An infrared light receiving diode 7 (light receiving element) is disposed adjacent to (e.g., in the horizontal direction or the vertical direction) the infrared light emitting diode 6 with substantially the same orientation as that of the infrared light emitting diode 6. The infrared light receiving diode 7 is configured to receive the infrared light transmitted through the vicinity of the center of the lens 4 from the vicinity of the center of the hood portion undersurface 2*b*.

As shown in FIG. 1(*a*), in an ordinary state where the obstructive object 8 is not present, the infrared light L1 emitted in the front direction of the infrared light emitting diode 6 proceeds diagonally upward, is transmitted through the vicinity of the center of the lens 4, and reaches the vicinity of the center of the hood portion undersurface 2*b*. As described above, the hood portion undersurface 2*b* is a glossy surface, but is not an ideal mirror surface. A large portion of the infrared light L1 reaching the hood portion undersurface 2*b* is reflected, and the reflected infrared light L1*a* proceeds diagonally downward away from the lens 4, but some of the infrared light L1 is diffused and reflected. The infrared light L1*a* proceeds without being obstructed. Thus, the infrared light L1*c* comprising the part of the infrared light L1*a* that is diffused and reflected by some kind of object ordinarily does not return. On the other hand, the infrared light L1*b* comprising the part of the infrared light L1 that is diffused and reflected by the hood portion undersurface 2*b* proceeds diagonally downward so as to approach the lens 4, is transmitted through the vicinity of the center of the lens 4, and reaches the infrared light receiving diode 7. For this reason, even in the ordinary state where the obstructive object 8 is not present, the infrared light receiving diode 7 receives a determinate amount of infrared light, and the amount of infrared light in this case becomes an intermediate value (reference received-light amount) corresponding to the ordinary state where the obstructive object 8 is not present.

As shown in FIG. 1(*b*), when the obstructive object 8 is present at the outer side of the hood portion 2*a*, the infrared light L1*a* that is reflected by the hood portion undersurface 2*b* and proceeds diagonally downward away from the lens 4 is diffused and reflected by the surface of the obstructive object 8. The infrared light L1*c* comprising the part of the infrared light that is diffused and reflected here returns diagonally upward, reaches the hood portion undersurface 2*b*, and is reflected. The infrared light L1*d* reflected here proceeds diagonally downward so as to approach the lens 4, is transmitted through the vicinity of the center of the lens 4, and reaches the infrared light receiving diode 7. In this case, the infrared light L1*b* comprising the part of the infrared light L1 that is diffused and reflected by the hood portion undersurface 2*b* also reaches the infrared light receiving diode 7 similar to when the obstructive object 8 is not present. Thus, the amount of light received by the infrared light receiving diode 7 becomes the sum of the infrared light L1*b* and the infrared light L1*d*, and becomes greater than the intermediate value corresponding to the ordinary state where the obstructive object 8 is not present. In this manner, the approach and/or presence of the obstructive object 8 in the vicinity of the outer side of the hood portion 2*a* can be detected by the change in the amount of light received by the infrared light receiving diode 7.

As shown in FIG. 1(*c*), when the obstructive object 8 is present in the vicinity of the lens 4, the infrared light L1 emitted in the front direction of the infrared light emitting diode 6 proceeds diagonally upward and is transmitted through the vicinity of the center of the lens 4, but it does not reach the vicinity of the center of the hood portion undersurface 2*b* because its optical path is blocked by the obstructive object 8. Instead, the infrared light L1 is diffused and reflected by the surface of the obstructive object 8, and the infrared light L1*e* comprising the part that is diffused and reflected here proceeds diagonally downward so as to approach the lens 4, is transmitted through the vicinity of the center of the lens 4, and reaches the infrared light receiving diode 7. The light amount of the infrared light L1*e* is dependent on the reflectance and/or surface condition of the obstructive object 8. If the obstructive object 8 is white, for example, it is conceivable for the light amount of the infrared light L1*e* to be greater than that of the infrared light L1*b* in the ordinary state where the obstructive object 8 is not present. And the amount of light received by the infrared light receiving diode 7 becomes greater than the amount of light received in the ordinary state where the obstructive object 8 is not present. If the obstructive object 8 is a light absorber such as black cloth, it is conceivable for the light amount of the infrared light L1*e* to be less than that of the infrared light L1*b* in the ordinary state where the obstructive object 8 is not present. And the amount of light received by the infrared light receiving diode 7 becomes less than the amount of light received in the ordinary state where the obstructive object 8 is not present. In this manner, the approach and/or presence of the obstructive object 8 in the vicinity of the lens 4 can be detected by the change in the amount of light received by the infrared light receiving diode 7.

According to the configuration of the passive infrared sensor 1 of the first embodiment described above, the infrared light emitted to the outside from the infrared light emitting diode 6 disposed inside the passive infrared sensor 1 is reflected outside, and the reflected light is received by the infrared light receiving diode 7 disposed inside the passive infrared sensor 1. Even when the obstructive object 8 is not present, the infrared light receiving diode 7 receives a determinate amount of infrared light, so that the approach and/or presence of obstructive objects 8 with various reflectance can be detected by the change in the amount of light received by the infrared light receiving diode 7. It is also easy to adjust the reflection amount, and the S/N ratio can be improved. Because the infrared light emitting diode 6 and the infrared light receiving diode 7 can be disposed adjacent to each other, the space necessary for them is reduced, and the passive infrared sensor 1 can be compactly configured. Moreover, affects resulting from ambient light such as sunlight being transmitted through the lens 4 and directly striking the infrared light receiving diode 7 are suppressed by the hood portion 2*a*. Thus, the passive infrared sensor 1 can exhibit a high obstructive object detecting capability even outdoors, and can also counter frost during cold periods or the like. Because the hood portion 2*a* also functions as a member that reflects the infrared light emitted from the infrared light emitting diode 6, it is not necessary to separately dispose a reflective plate or the like for the infrared light.

Second Embodiment

In the first embodiment, the obstructive object detection-use infrared light was reflected by the undersurface of the hood formed above the lens at the outer side of the case of the passive infrared sensor, but the invention is not limited to this configuration. For example, a separate part bonded to and integrated with the case at the time of installation, such as a hood or external cover including a hood, may be prepared as an optional part, and a reflective plate maybe disposed on the hood undersurfaces of these so that the presence of an obstructive object can be detected in the same manner as in the first embodiment. This will be used as a second embodiment and described next.

Figure 2A:
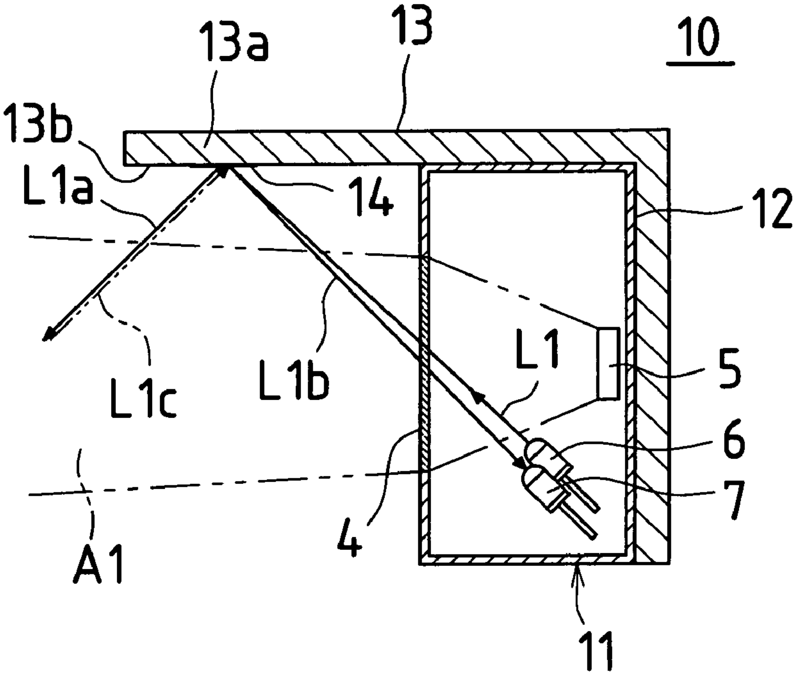
FIG. 2(*a*) is a schematic view describing the operating principle of an obstacle detection system associated with a second embodiment of the invention, and shows an ordinary state where an obstructive object is not present.
Figure 2B:
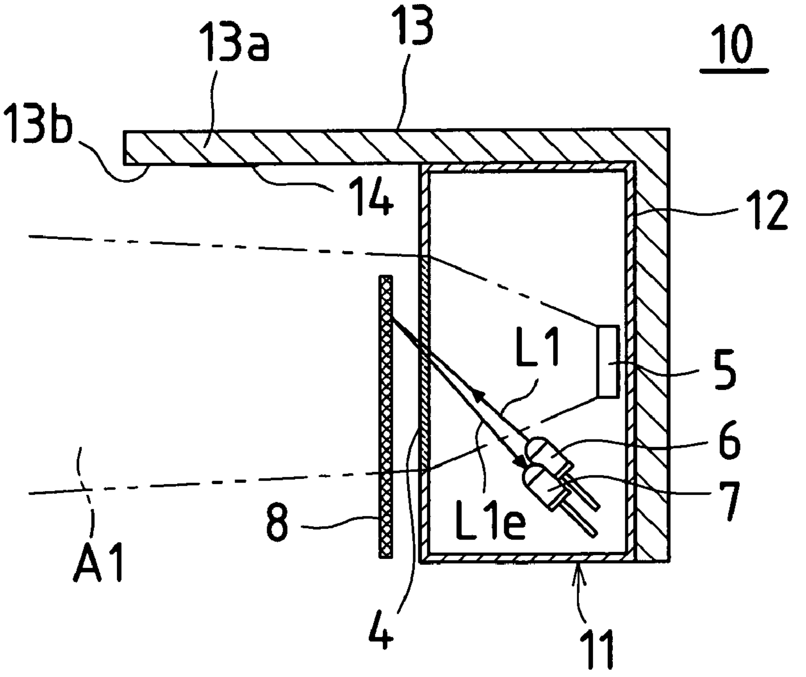

FIGS. 2(*a*) and 2(*b*) are schematic views describing the operating principle of an obstacle detection system 10 associated with a second embodiment of the invention. FIG. 2(*a*) shows an ordinary state where the obstructive object 8 is not present, and FIG. 2(*b*) shows a state where the obstructive object 8 is present in the vicinity of the lens 4 of a passive infrared sensor 11. The same reference numerals will be used with respect to constituent members that are the same as those in the first embodiment described with reference to FIGS. 1(*a*) to 1(*c*), and the point of difference will be mainly described.

As shown in FIGS. 2(*a*) and 2(*b*), in the obstacle detection system 10, a hood portion is not formed on a case 12 (cover) itself of the passive infrared sensor 11, but an optional cover 13 serving as a separate part integrated with the case 12 is bonded to the case 12. Additionally, a reflective plate 14 is disposed on an undersurface 13*b* of a hood portion 13*a* that is a projecting portion of the optional cover 13. The remaining configuration is the same as that of the first embodiment.

The infrared light emitting diode 6 (light emitting element) is disposed at a lower portion inside the case 12 and configured to emit infrared light diagonally upward through the vicinity of the center of the lens 4. The infrared light receiving diode 7 (light receiving element) is disposed adjacent to (e.g., in the horizontal direction or the vertical direction) the infrared light emitting diode 6 with substantially the same orientation as that of the infrared light emitting diode 6. The infrared light receiving diode 7 is configured to receive the infrared light transmitted through the vicinity of the center of the lens 4 and arriving from diagonally upward.

The reflective plate 14 is disposed on the undersurface 13*b* of the hood portion 13*a* of the optional cover 13 on an extension line of the direction in which the infrared light is emitted from the infrared light emitting diode 6. Here, the surface of the reflective plate 14 is not a mirror surface but a glossy surface. The material of the reflective plate 14 is not limited to a hard member. For example, a seal-like soft member whose surface is glossy may be adhered to the undersurface 13*b* of the hood portion 13*a*.

As shown in FIG. 2(*a*), in the ordinary state where the obstructive object 8 is not present, the infrared light L1 emitted in the front direction of the infrared light emitting diode 6 proceeds diagonally upward, is transmitted through the vicinity of the center of the lens 4, and reaches the reflective plate 14. The surface of the reflective plate 14 is a glossy surface, but is not an ideal mirror surface. Thus, a large portion of the infrared light L1 is reflected, and the reflected infrared light L1*a* proceeds diagonally downward away from the lens 4, but some of the infrared light L1 is diffused and reflected. The infrared light L1*a* proceeds without being obstructed. Thus, the infrared light L1*c* comprising the part of the infrared light L1*a* that is diffused and reflected by some kind of object ordinarily does not return. On the other hand, the infrared light L1*b* comprising the part of the infrared light L1 that is diffused and reflected by the hood portion undersurface 2*b* proceeds diagonally downward so as to approach the lens 4, is transmitted through the vicinity of the center of the lens 4, and reaches the infrared light receiving diode 7. For this reason, even in the ordinary state where the obstructive object 8 is not present, the infrared light receiving diode 7 receives a determinate amount of infrared light, and the amount of infrared light in this case becomes an intermediate value (reference light receiving amount) corresponding to the ordinary state where the obstructive object 8 is not present.

As shown in FIG. 2(*b*), when the obstructive object 8 is present in the vicinity of the lens 4, the infrared light L1 emitted in the front direction of the infrared light emitting diode 6 proceeds diagonally upward and is transmitted through the vicinity of the center of the lens 4, but it does not reach the reflective plate 14 because its optical path is blocked by the obstructive object 8. Instead, the infrared light L1 is diffused and reflected by the surface of the obstructive object 8, and the infrared light L1*e* comprising the part that is diffused and reflected here proceeds diagonally downward so as to approach the lens 4, is transmitted through the vicinity of the center of the lens 4, and reaches the infrared light receiving diode 7. Thus, similar to the first embodiment, the amount of light received by the infrared light receiving diode 7 changes depending on the reflectance and/or surface condition of the obstructive object 8. Therefore, the approach and/or presence of the obstructive object 8 can be detected by the change in the amount of light received by the infrared light receiving diode 7.

According to the configuration of the obstacle detection system 10 of the second embodiment described above, the infrared light emitted to the outside from the infrared light emitting diode 6 disposed inside the passive infrared sensor 11 is reflected outside, and the reflected light is received by the infrared light receiving diode 7 disposed inside the passive infrared sensor 11. When the obstructive object 8 is not present, the infrared light receiving diode 7 receives a determinate amount of infrared light, so that the approach and/or presence of obstructive objects 8 with various reflectance can be detected by the change in the amount of light received by the infrared light receiving diode 7. Because it is not necessary for a hood portion to be formed on the body of the passive infrared sensor 11, the reflective plate 14 may be disposed on the optional cover. Thus, restrictions such as the shape of the passive infrared sensor 11 body can be reduced.

Also, the place where the reflective plate 14 is disposed is not limited to the optional cover. The reflective plate 14 may be disposed at another place, such as another optional part for the passive infrared sensor 11 or another device disposed in proximity to the passive infrared sensor 11, as long as the reflective plate 14 is on an extension line of the direction in which the infrared light is emitted by the infrared light emitting diode 6.

The invention can be implemented in various other ways without departing from the spirit or principal features thereof. Thus, the preceding embodiments have been provided only for the purpose of illustration and should not be construed as limiting the invention. It is intended that the scope of the invention be defined by the following claims and not limited to the body of the specification. All modifications and changes belonging to an equivalent scope of the invention are included in the scope of the invention.

What is claimed is:

1. A passive infrared sensor where an infrared sensing element and an optical system that sets a detection area of the infrared sensing element are covered with a cover, the passive infrared sensor comprising:

at least one light emitting element operable to emit infrared light from an inside of the cover to an outside of the cover through the optical system;

at least one reflective region disposed outside of the cover, the reflective region reflecting at least some of the infrared light emitted from the light emitting element; and at least one light receiving element operable to receive the infrared light reflected by the reflective region, transmitted through the optical system and reaching the inside of the cover, wherein the reflective region is part of an undersurface of a projecting portion disposed outside of the cover.

2. The passive infrared sensor of claim 1, wherein at least the part of the undersurface of the projecting portion serving as the reflective region is a glossy surface.

3. The passive infrared sensor of claim 2, wherein the light emitting element is disposed inside of the cover and below the projecting portion, and the direction in which the infrared light is emitted by the light emitting element faces the projecting portion, and the light receiving element is disposed inside of the cover and below the projecting portion, and the direction in which the infrared light is received by the light receiving element faces the projecting portion.

4. The passive infrared sensor of claim 3, wherein the light emitting element and the light receiving element are disposed in mutual proximity.

5. The passive infrared sensor of claim 2, wherein the projecting portion is a hood.

6. The passive infrared sensor of claim 3, wherein the projecting portion is a hood.

7. The passive infrared sensor of claim 1, wherein the light emitting element is disposed inside of the cover and below the projecting portion, and the direction in which the infrared light is emitted by the light emitting element faces the projecting portion, and the light receiving element is disposed inside of the cover and below the projecting portion, and the direction in which the infrared light is received by the light receiving element faces the projecting portion.

8. The passive infrared sensor of claim 7, wherein the light emitting element and the light receiving element are disposed in mutual proximity.

9. The passive infrared sensor of claim 8, wherein the projecting portion is a hood.

10. The passive infrared sensor of claim 7, wherein the projecting portion is a hood.

11. The passive infrared sensor of claim 1, wherein the projecting portion is a hood.

12. A passive infrared sensor where an infrared sensing element and an optical system that sets a detection area of the infrared sensing element are covered with a cover, the passive infrared sensor comprising:

at least one light emitting element operable to emit infrared light from an inside of the cover to an outside of the cover through the optical system;

at least one reflective region disposed outside of the cover, the reflective region reflecting at least some of the infrared light emitted from the light emitting element; and at least one light receiving element operable to receive the infrared light reflected by the reflective region, transmitted through the optical system and reaching the inside of the cover, wherein the reflective region is formed by a reflective member being disposed on the undersurface of the projecting portion disposed outside of the cover.

13. The passive infrared sensor of claim 12, wherein the light emitting element is disposed inside of the cover and below the projecting portion, and the direction in which the infrared light is emitted by the light emitting element faces the projecting portion, and the light receiving element is disposed inside of the cover and below the projecting portion, and the direction in which the infrared light is received by the light receiving element faces the projecting portion.

14. The passive infrared sensor of claim 13, wherein the light emitting element and the light receiving element are disposed in mutual proximity.

15. The passive infrared sensor of claim 13, wherein the projecting portion is a hood.

16. The passive infrared sensor of claim 12, wherein the projecting portion is a hood.

17. An obstacle detection system used in a passive infrared sensor where an infrared sensing element and an optical system that sets a detection area of the infrared sensing element are covered with a cover, the obstacle detection system comprising:

at least one light emitting element operable to emit infrared light from an inside of the cover to an outside of the cover through the optical system;

at least one reflective member disposed outside of the cover, the reflective member reflecting at least some of the infrared light emitted from the light emitting element; and at least one light receiving element operable to receive the infrared light reflected by the reflective member, transmitted through the optical system and reaching the inside of the cover, wherein the light emitting element and the light receiving element are disposed so that the direction in which the infrared light is emitted by the light emitting element and the direction in which the infrared light is received by the light receiving element both face diagonally upward, and the reflective member is disposed on an extension line of the direction in which the infrared light is emitted by the light emitting element and the direction in which the infrared light is received by the light receiving element.

18. The obstacle detection system of claim 17, wherein the light emitting element and the light receiving element are disposed in mutual proximity.

* * * * *